United States Patent [19]

Chen

[11] Patent Number: 5,261,867
[45] Date of Patent: Nov. 16, 1993

[54] RETARDING DEVICE FOR AN EXERCISER

[76] Inventor: Ping Chen, No. 20, Nan-Mei St., Taichung City, Taiwan

[21] Appl. No.: 51,747

[22] Filed: Apr. 22, 1993

[51] Int. Cl.$^5$ ............................. A63B 22/04; A63B 21/008
[52] U.S. Cl. ........................................... 482/112; 482/53
[58] Field of Search ................... 482/51, 52, 53, 111, 482/112, 113

[56] References Cited

U.S. PATENT DOCUMENTS

| | | | |
|---|---|---|---|
| 3,834,646 | 9/1974 | Spector | 482/112 |
| 4,651,986 | 3/1987 | Wang | 482/112 |
| 4,981,199 | 1/1991 | Tsai | 482/112 |

*Primary Examiner*—Stephen R. Crow
*Attorney, Agent, or Firm*—Ladas & Parry

[57] ABSTRACT

A retarding device is to be used in an exerciser and includes a tubular housing which has an open top end and an intermediate part that is provided with an inwardly projecting annular support, and a tubular adjustment unit which is mounted on the open top end and which is movable axially relative to the tubular housing. A drive shaft extends axially into the tubular housing through a closed top of the adjustment unit and through the annular support. The drive shaft is movable axially in the tubular housing. A tubular rubber friction unit is provided in the tubular housing around the drive shaft and is interposed between the closed top of the adjustment unit and the annular support. Axial movement of the adjustment unit toward the tubular housing results in a compression force on the friction unit, thereby deforming the friction unit such that at least a part of an inner wall surface of the friction unit projects radially inward to contact the drive shaft so as to resist axial movement of the drive shaft in the tubular housing.

6 Claims, 11 Drawing Sheets

RETARDING DEVICE FOR AN EXERCISER

BACKGROUND OF THE INVENTION

1. Field of the Invention

The invention relates to a retarding device for an exerciser, more particularly to a retarding device which can replace conventional hydraulic cylinders used in exercisers.

2. Description of the Related Art

Conventional exercisers usually incorporate a hydraulic cylinder unit to serve as a retarding device therefor. Referring to FIGS. 1 and 2, a conventional hydraulic stepper is shown to comprise an L-shaped frame (1) and two pedal units (2) hinged respectively on two sides of the frame (1). A hydraulic cylinder (3, 4) is provided on top of each of the pedal units (2). Each of the hydraulic cylinders (3, 4) has one end hinged to the frame (1) and a piston shaft (3a, 4a) connected to the respective pedal unit (2). A fluid path (6) interconnects the hydraulic cylinders (3, 4). When pressure is applied so as to move a first one of the pedal units (2) downward, the first one of the pedal units (2) pivots about a pin (1a) on the frame (1), thereby pushing the piston shaft (3a) of the corresponding hydraulic cylinder (3) further into the cylinder body, as best illustrated in FIG. 2. Hydraulic oil (5) in the hydraulic cylinder (3) flows out of the latter and is transferred to the other hydraulic cylinder (4) via the fluid path (6). The piston shaft (4a) of the other hydraulic cylinder (4) is pushed downward, thereby causing a second one of the pedal units (2) to pivot upwardly. This illustrates how reciprocating movement of the pedal units (2) is achieved in the conventional hydraulic stepper.

The main drawbacks of using hydraulic cylinder units as the retarding device in an exerciser are as follows:

1. Leakage of hydraulic oil in the hydraulic cylinder units can easily occur, thus hindering the proper operation of the exerciser.

2. The hydraulic cylinder units are relatively expensive, thereby increasing the cost of the exerciser.

SUMMARY OF THE INVENTION

Therefore, the main object of the present invention is to provide a retarding device which is simple in construction and which can replace conventional hydraulic cylinders used in exercisers.

Another object of the present invention is to provide a retarding device which is relatively inexpensive and which can generate resistance so as to retard movement of the movable parts of an exerciser.

Accordingly, the retarding device of the present invention is to be used in an exerciser and comprises:

a tubular housing having an open top end and an intermediate part which is provided with an inwardly projecting annular support;

a tubular adjustment unit mounted on the open top end and movable axially relative to the tubular housing, the adjustment unit having a closed top;

a drive shaft extending axially into the tubular housing through the closed top of the adjustment unit and through the annular support, the drive shaft being movable axially in the tubular housing; and a tubular rubber friction unit provided in the tubular housing around the drive shaft and interposed between the closed top of the adjustment unit and the annular support, axial movement of the adjustment unit toward the tubular housing resulting in a compression force on the friction unit, the friction unit deforming such that at least a part of an inner wall surface of the friction unit projects radially inward to contact the drive shaft so as to resist axial movement of the drive shaft in the tubular housing.

BRIEF DESCRIPTION OF THE DRAWINGS

Other features and advantages of the present invention will become apparent in the following detailed description of the preferred embodiments, with reference to the accompanying drawings, of which.

DETAILED DESCRIPTION OF THE PREFERRED EMBODIMENTS

Figure 1:
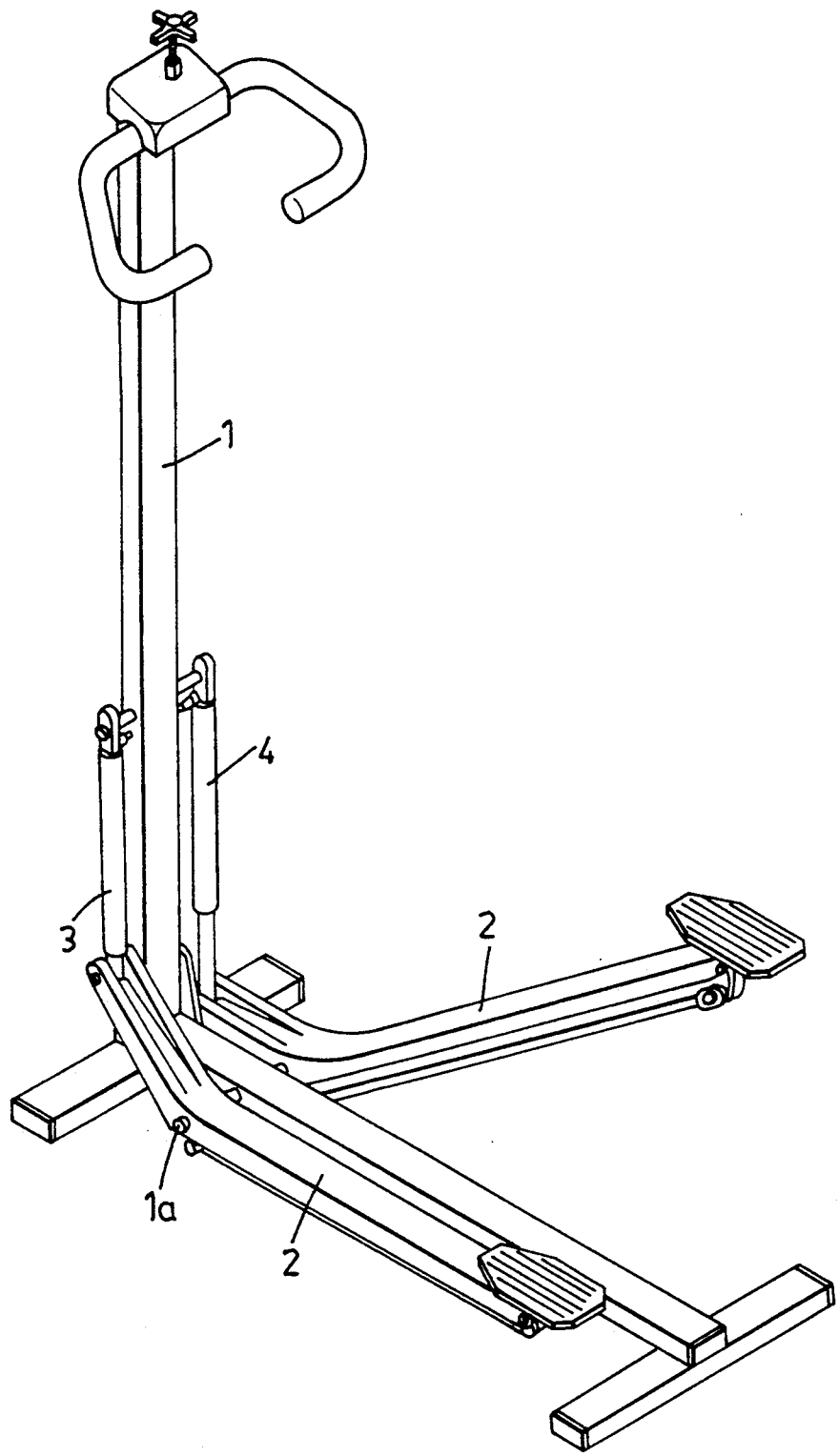
FIG. 1 is a perspective view of a conventional hydraulic stepper.
Figure 2:
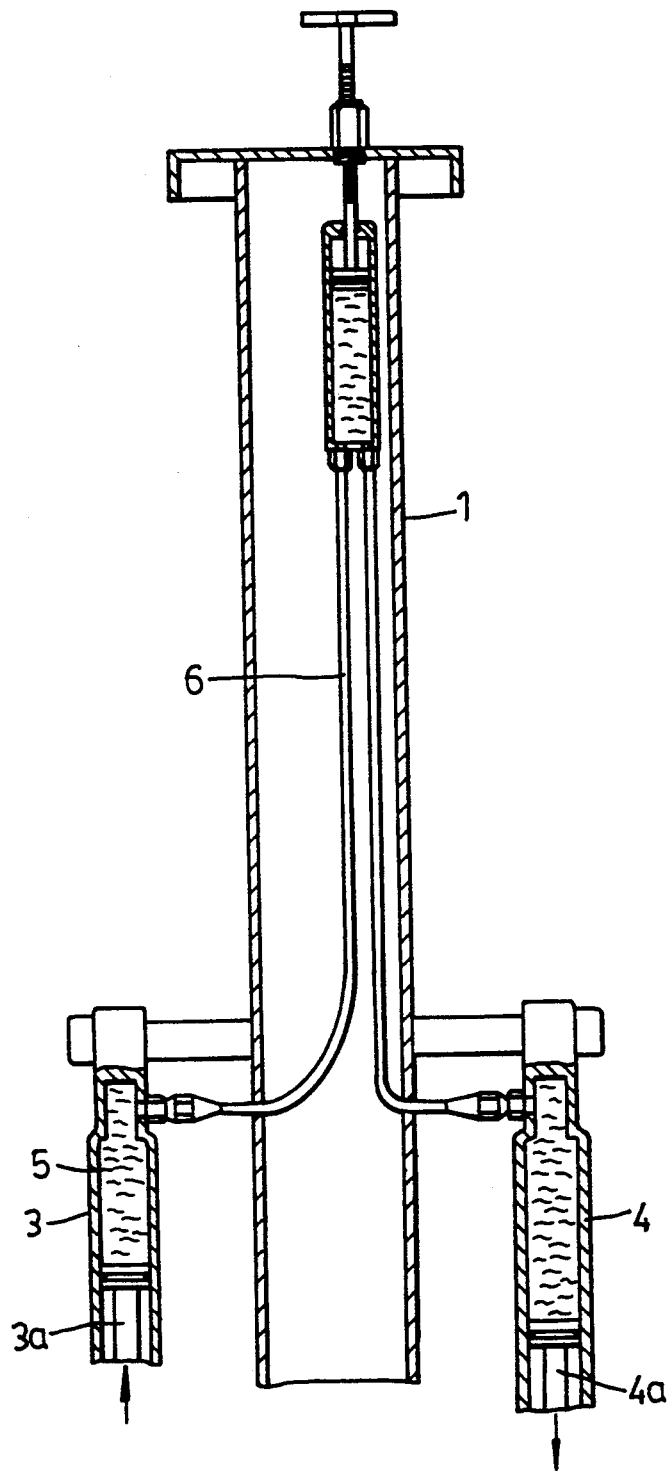
FIG. 2 is a fragmentary sectional view which illustrates the operation of the conventional hydraulic stepper shown in FIG. 1.
Figure 3:
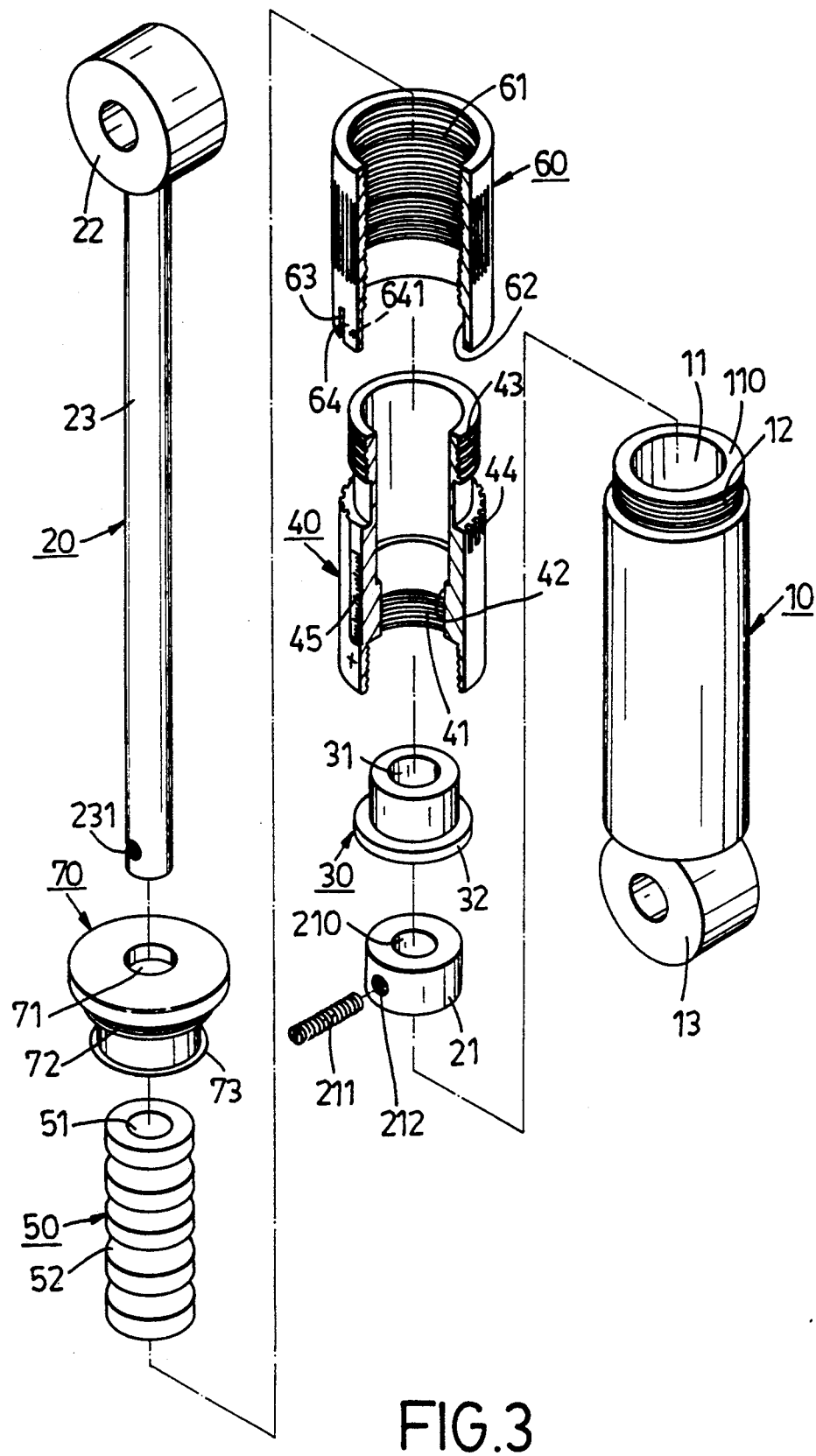
FIG. 3 is an exploded view of the first preferred embodiment of a retarding device according to the present invention.

Referring to FIG. 3, the first preferred embodiment of a retarding device according to the present invention is to be used in an exerciser and comprises a tubular housing with a mounting part (10) and a retaining part (40), a drive shaft (20), an annular support (30), a tubular friction unit (50), a tubular adjustment unit (60), and a top cover (70).

The mounting part (10) confines a receiving space (11) and has an open top (12) that is threaded externally. The bottom of the mounting part (10) is formed with a coupling ring (13) so as to couple with an appropriate part of the exerciser (not shown).

The drive shaft (20) includes a thin cylindrical shaft (23) which has a lower end that is formed with a diametrically extending threaded hole (231). An enlarged cylindrical limit piece (21) is formed with an axial through hole (210) and a diametrically extending threaded hole (212). The lower end of the cylindrical shaft (23) extends into the through hole (210) of the limit piece (21) and is fastened thereto by means of a screw fastener (211) which engages threadedly the holes (212, 231). The cylindrical shaft (23) extends into the receiving space (11) and has a top end which is formed with a coupling ring (22) so as to couple with an appropriate part of the exerciser (not shown).

The annular support (30) is formed with an axial hole (31) to permit the cylindrical shaft (23) to extend therethrough. The bottom end of the annular support (30) is formed with an annular peripheral flange (32) which is to be disposed on a distal top end surface (110) of the mounting part (10). The annular support (30) serves to limit movement of the limit piece (21) within the receiving space (11).

The retaining part (40) has a lower end (41) which is threaded internally so as to engage the open top (12) of the mounting part (10). The retaining part (40) has an inner wall surface that is formed with an inward annular projection (42) adjacent to the lower end (41) for positioning the annular support (30) therein. The retaining part (40) further has a top end (43) that is threaded externally and an outer wall surface that is formed with a plurality of angularly spaced peripheral teeth (44) and a graduation (45) located axially thereon.

The tubular friction unit (50) is made of rubber and has an axially extending through hole (51) to permit the cylindrical shaft (23) to extend therethrough. The friction unit (50) has an outer surface which is formed with a series of annular peripheral grooves (52) that are arc-shaped in cross-section.

The tubular adjustment unit (60) has a threaded internal wall surface (61) to engage rotatably the top end (43) of the retaining part (40). The adjustment unit (60) has a lower end that is formed with a downwardly extending peripheral flange (62). The flange (62) is formed with a spaced pair of axially extending slits (63), thereby forming a resilient leaf (64) on the flange (62). The resilient leaf (64) has an inner wall surface that is formed with a rounded stud (641).

The top cover (70) is formed with a central through hole (71) which permits the extension of the cylindrical shaft (23) therethrough. The top cover (70) has an intermediate part (72) which is threaded externally so as to engage the internal wall surface (61) of the adjustment unit (60). The top cover (70) further has a flat bottom (73) which presses against a
top end of the tubular friction unit (50).

Figure 4:
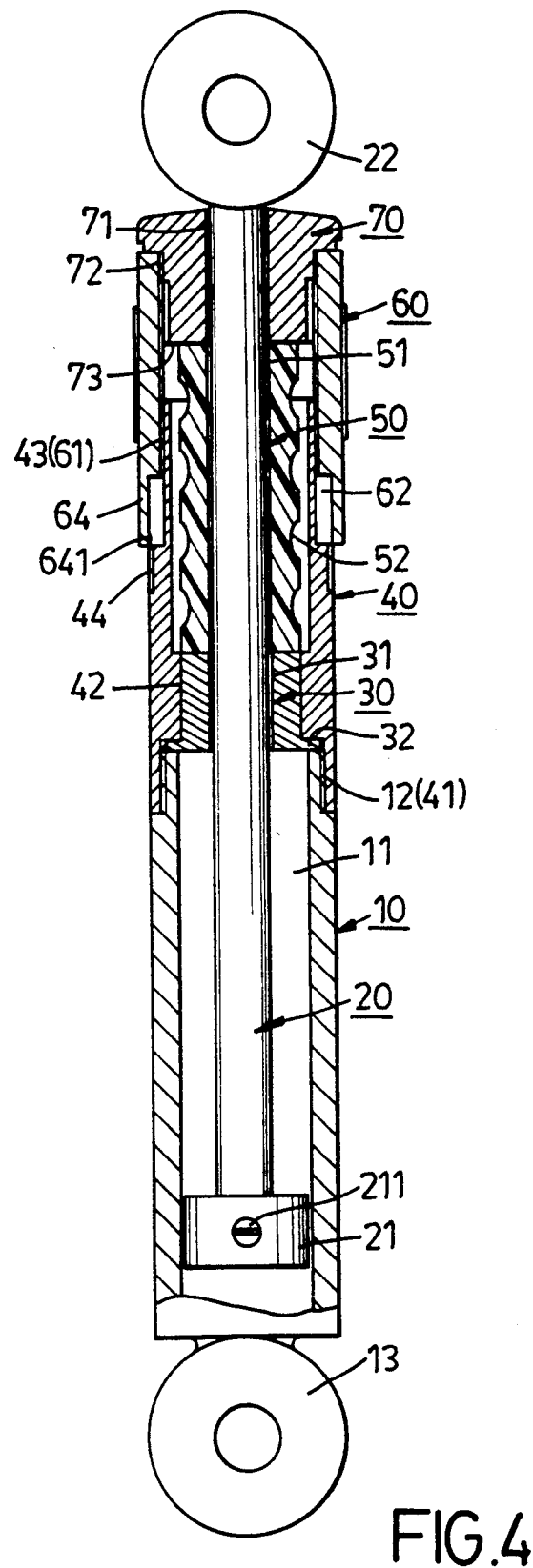
FIG. 4 is a sectional view of the first preferred embodiment.
Figure 6:
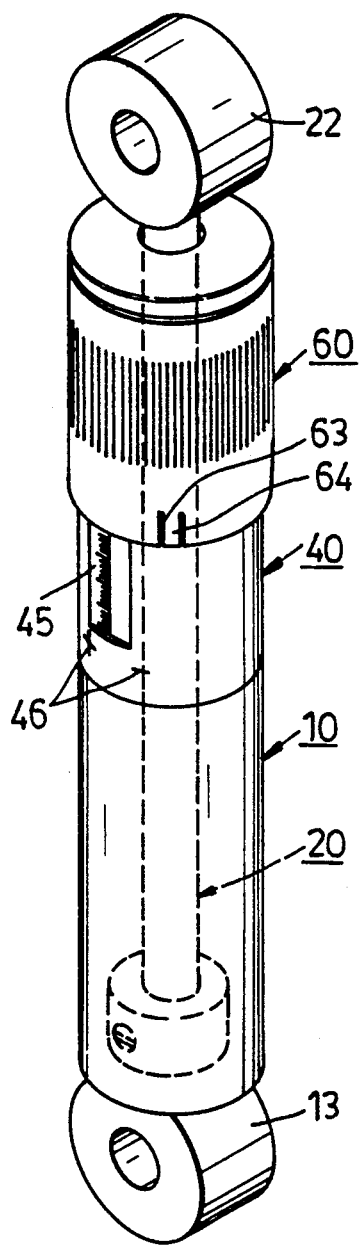
FIG. 6 is a perspective view of the first preferred embodiment.

Assembly of the first preferred embodiment is as follows: The top cover (70), the adjustment unit (60), the friction unit (40) and the annular support (30) are sleeved on the cylindrical shaft (23) in this order. The limit piece (21) is then fastened to the lower end of the cylindrical shaft (23) by means of the screw fastener (211). The lower end of the cylindrical shaft (23) is extended into the receiving space (11) of the mounting part (10), and the mounting part (10) and retaining part (40) are inter-engaged afterward. At this stage, the annular support (30) is positioned by the inward annular projection (42), thus securing the former in the tubular housing. The adjustment unit (60) and the retaining part (40) are inter-engaged, and the top cover (70) is then secured on the adjustment unit (60). The friction unit (50) is interposed between the flat bottom (73) of the top cover (70) and the annular support (30) at this stage, as best illustrated in FIG. 4. The first preferred embodiment is now ready for use, as shown in FIG. 6.

Referring once more to FIG. 4, in order to facilitate initial positioning of the movable parts of the exerciser, the flat bottom (73) of the top cover (70) and the annular support (30) do not exert a compressive force on the friction unit (50). Thus, a small clearance is present between the inner wall surface of the friction unit (50) and the cylindrical shaft (23). The cylindrical shaft (23) can be moved axially within the tubular housing under the presence of minimal resistance at this stage.

Figure 5:
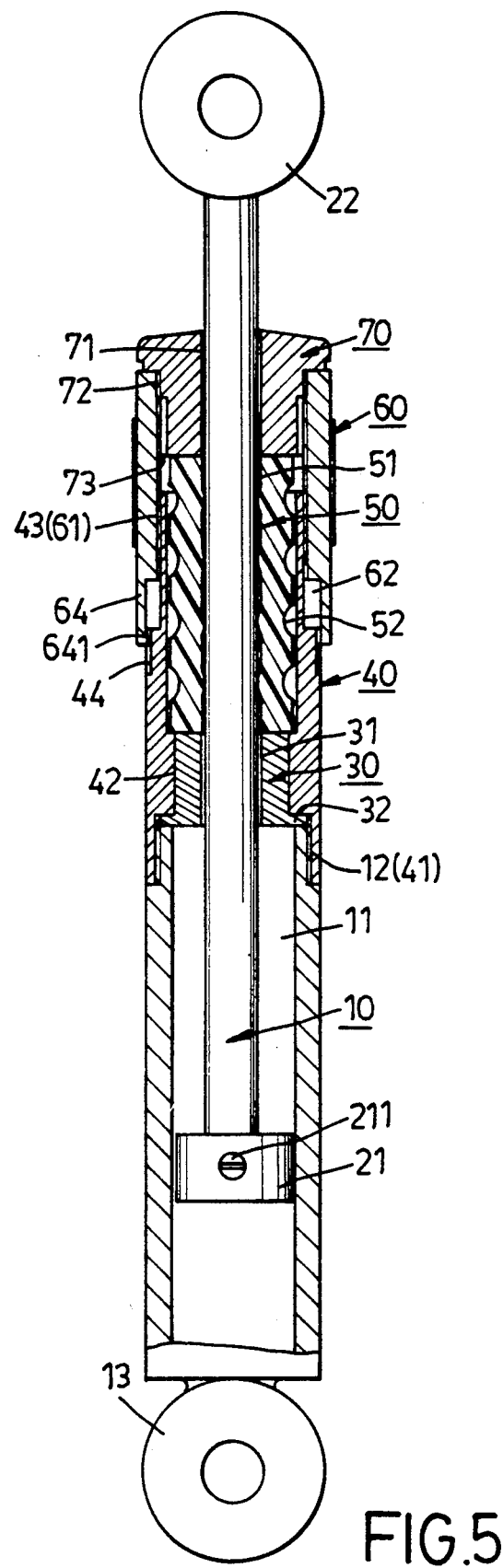
FIG. 5 is a sectional view of the first preferred embodiment to illustrate operation of the same.

The resistance to be offered by the retarding device of the present invention should be adjusted so as to correspond with the body weight and the age of the user. Referring to FIG. 5, in order to adjust the resistance of the retarding device, the adjustment unit (60) is rotated relative to the retaining part (40) so that the top cover (70) moves downwardly in an axial direction. The flat bottom (73) of the top cover (70) and the annular support (30) exert a compression force on the friction unit (50), thereby deforming the latter such that the sizes of the peripheral grooves (52) are reduced so that parts of the friction unit (50) which define the peripheral grooves (52) project in a radial inward direction in order to achieve contact with the cylindrical shaft (23). The tightness of contact between the friction unit (50) and the surface of the cylindrical shaft (23) is varied by varying the degree of compression of the friction unit (50) in order to vary correspondingly the resistance to axial movement of the drive shaft (20).

Referring again to FIG. 5, when the retarding device is assembled, the peripheral flange (62) of the adjustment unit (60) is disposed around the peripheral teeth (44) of the retaining part (40) such that the stud (641) on the resilient leaf (64) of the flange (62) extends into a notch formed between two adjacent teeth (44). When the adjustment unit (60) is rotated relative to the retaining part (40) so as to adjust the resistance of the retarding device, the stud (641) moves past certain ones of the teeth (44), thereby generating a clicking sound. The bottom of the adjustment unit (60) is made to correspond with the graduation (45) on the retaining part (40) to adjust the resistance of the retarding device to the appropriate level. Referring to FIG. 6, the retarding device is formed with "+" and "−" markings (46) so as to indicate the direction of rotation of the adjustment unit (60) in order to increase or decrease correspondingly the resistance of the retarding device.

Figure 7:
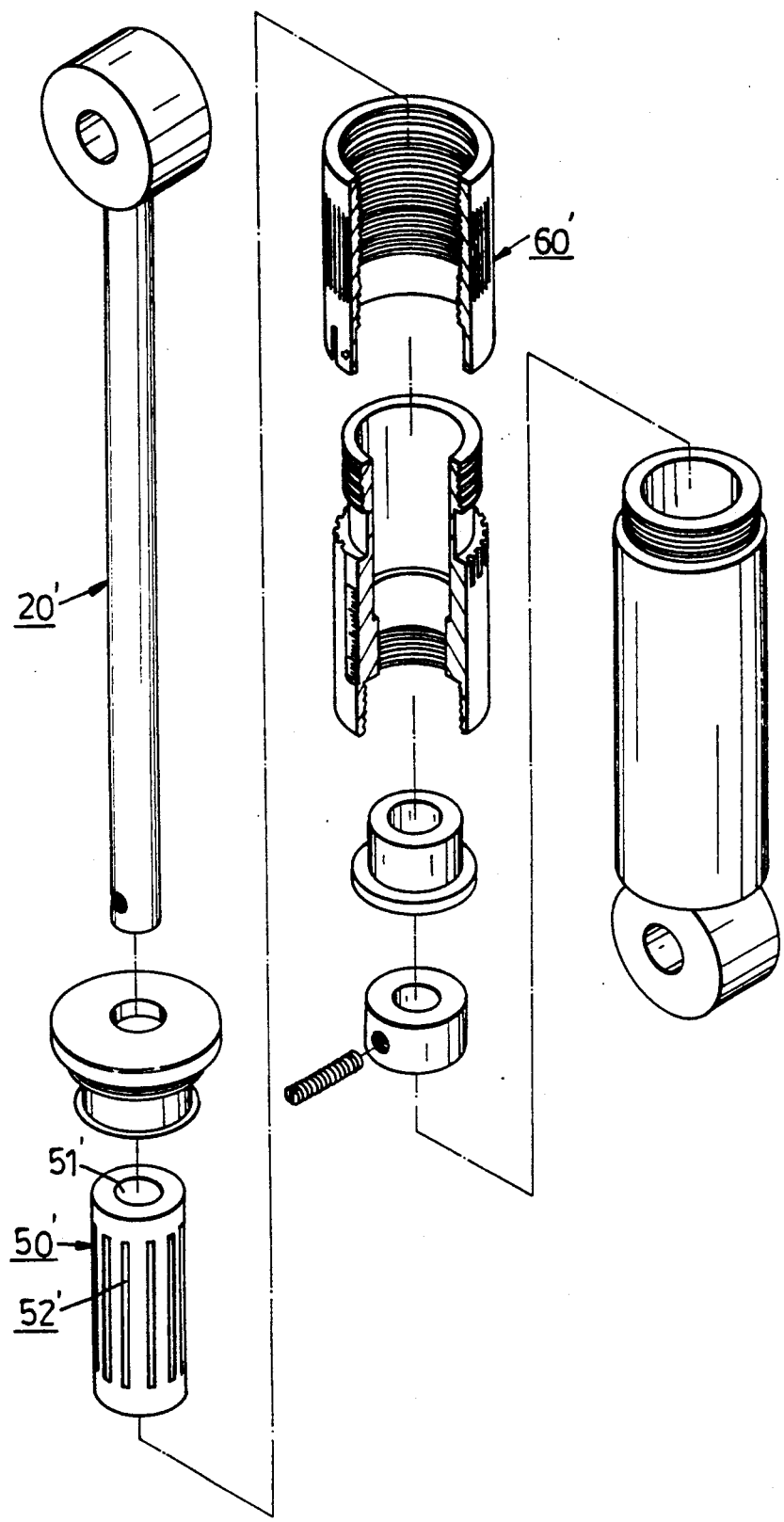
FIG. 7 is an exploded view of the second preferred embodiment of a retarding device according to the present invention.
Figure 8:
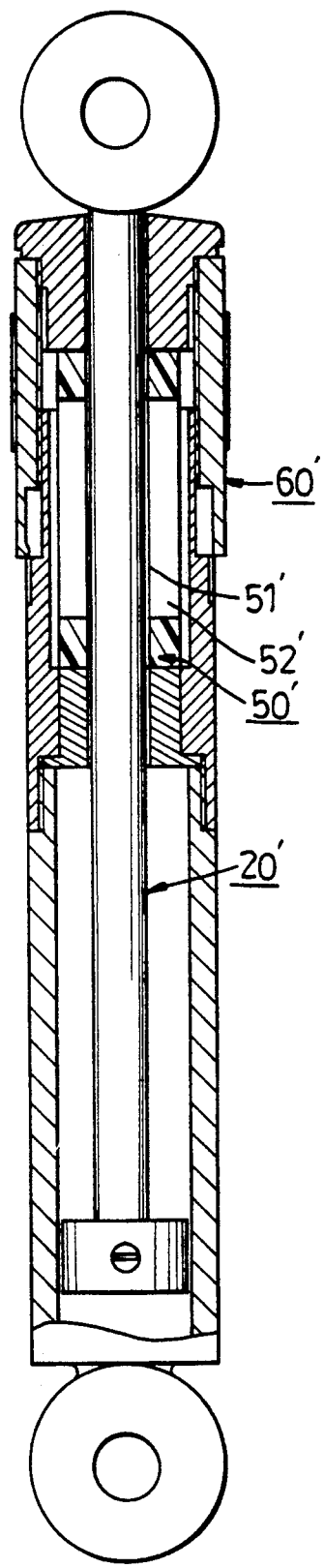
FIG. 8 is a sectional view of the second preferred embodiment.
Figure 9:
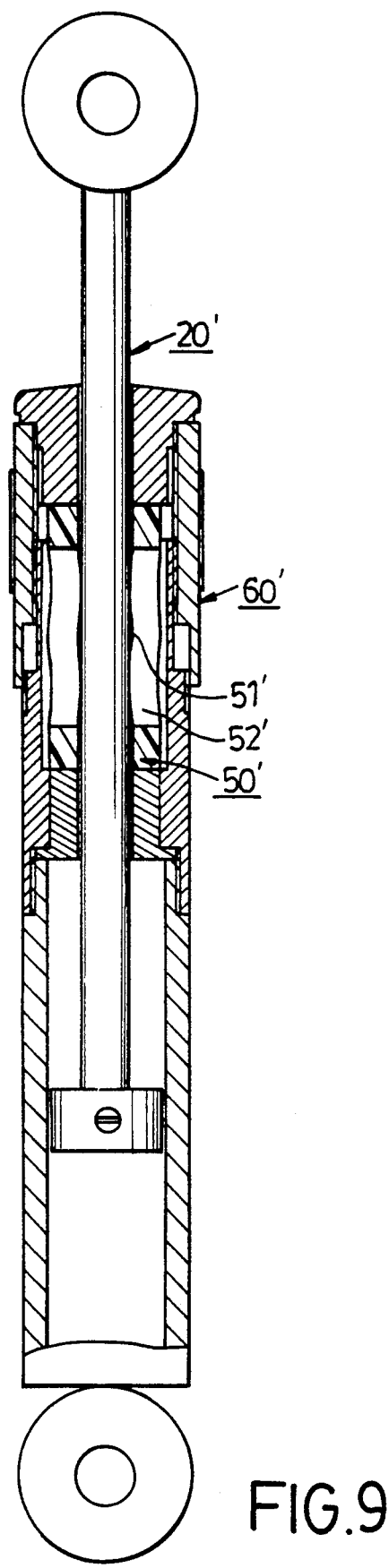
FIG. 9 is a sectional view of the second preferred embodiment to illustrate operation of the same.

The second preferred embodiment of a retarding device according to the present invention is shown in FIGS. 7 and 8. The second preferred embodiment is substantially similar to the previous embodiment except that in the present embodiment, the tubular friction unit (50') has an outer surface which is formed with a plurality of axially extending slits (52'). Referring to FIG. 9, when the adjustment unit (60') is rotated to vary the resistance offered by the retarding device of the second preferred embodiment, a compressive force is exerted on the friction unit (50'), thereby deforming the latter such that an intermediate part of the friction unit (50') projects in a radial inward direction in order to achieve contact with the cylindrical shaft (23'). As with the first preferred embodiment, the tightness of contact between the friction unit (50') and the surface of the cylindrical shaft (23') is varied by varying the degree of compression of the friction unit (50') in order to vary correspondingly the resistance to axial movement of the drive shaft (20').

Figure 10:
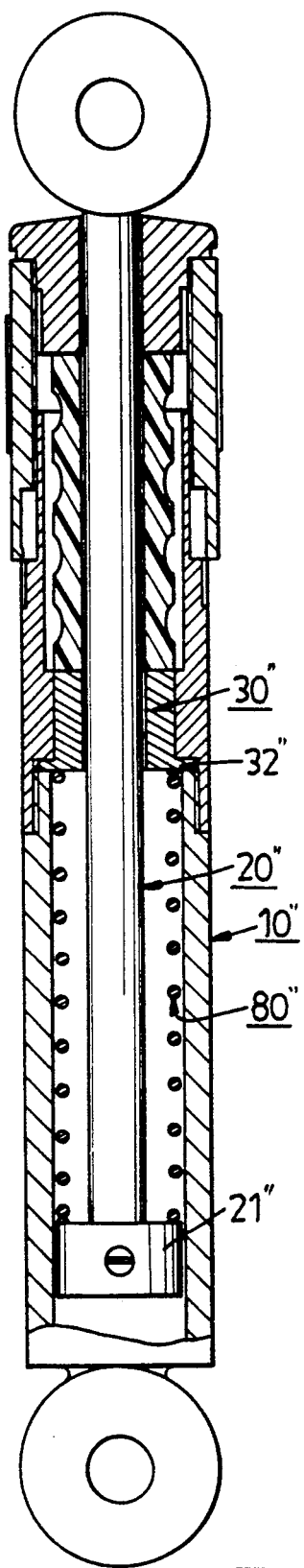
FIG. 10 is a sectional view of the third preferred embodiment of a retarding device according to the present invention.

The construction of the first and second preferred embodiments can be modified so as to facilitate the return of the drive shaft to a normal operating position. Referring to FIG. 10, a spring member (80'') is provided inside the mounting part (10'') and is interposed between the annular support (30'') and the limit piece (21''). The spring member (80'') is compressed whenever the drive shaft (20'') is pulled upwardly. When the pulling force on the drive shaft (20'') is removed, the spring member (80") expands to bias the drive shaft (20") to the normal operating position.

Figure 11:
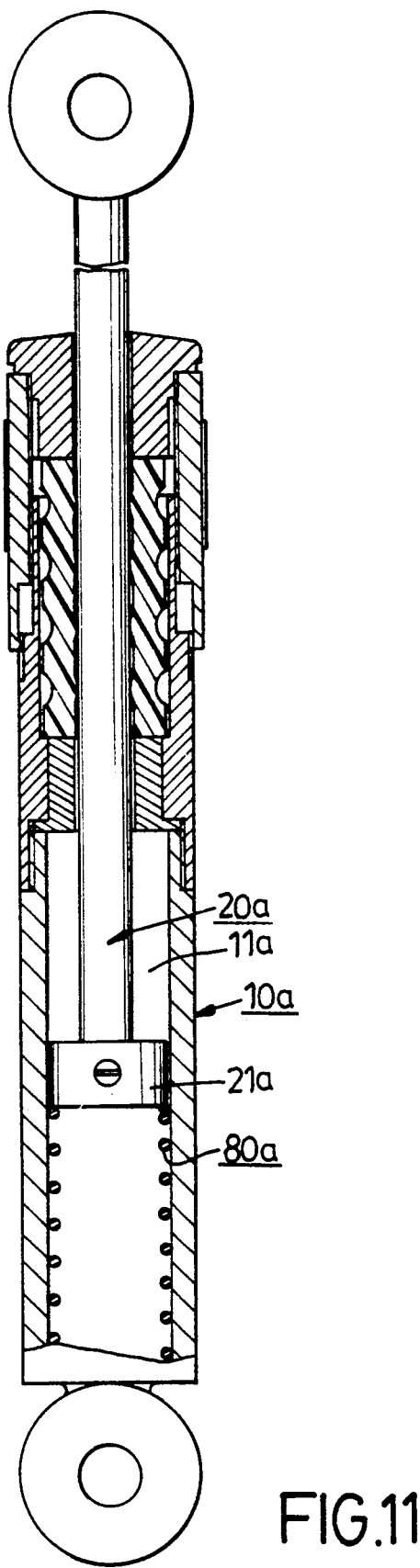
FIG. 11 is a sectional view of the fourth preferred embodiment of a retarding device according to the present invention.

In an alternative embodiment of the present invention, a spring member (80a) is provided inside the mounting part (10a) and is interposed between the limit piece (21a) and the bottom of the mounting part (10a), as best illustrated in FIG. 11. The spring member (80a) is compressed whenever the drive shaft (20a) is pushed downwardly. When the pushing force on the drive shaft (20a) is removed, the spring member (80a) expands to bias the drive shaft (20a) to the normal operating position.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A retarding device for an exerciser, comprising:
   a tubular housing having an open top end and an intermediate part which is provided with an inwardly projecting annular support;
   a tubular adjustment unit mounted on said open top end and movable axially relative to said tubular housing, said adjustment unit having a closed top;
   a drive shaft extending axially into said tubular housing through said closed top of said adjustment unit and through said annular support, said drive shaft being movable axially in said tubular housing; and
   a tubular rubber friction unit provided in said tubular housing around said drive shaft and interposed between said closed top of adjustment unit and said annular support, axial movement of said adjustment unit toward said tubular housing resulting in a compression force on said friction unit, said friction unit deforming such that at least a part of an inner wall surface of said friction unit projects radially inward to contact said drive shaft so as to resist axial movement of said drive shaft in said tubular housing.

2. The retarding device as claimed in claim 1, wherein said friction unit has an outer wall surface that is formed with a series of annular peripheral grooves that are arc-shaped in cross-section.

3. The retarding device as claimed in claim 1, wherein said friction unit is formed with a plurality of axially extending slits.

4. The retarding device as claimed in claim 1, further comprising a spring means disposed inside said tubular housing to bias said drive shaft upwardly to a normal position.

5. The retarding device as claimed in claim 1, further comprising a spring means disposed inside said tubular housing to bias said drive shaft downwardly to a normal position.

6. The retarding device as claimed in claim 1, wherein said adjustment unit has a threaded internal wall surface, and said open top end of said tubular housing is threaded externally so as to engage threadably said internal wall surface of said adjustment unit.

* * * * *